United States Patent [19]
Hale et al.

[11] 4,222,808
[45] Sep. 16, 1980

[54] SKI MANUFACTURING PROCESS

[75] Inventors: Charles R. Hale, Glastonbury; Vincent E. Toloczko, Thompson; Robert C. Gammons, Southington; Frederick J. Eckert, Branford; John J. Muller, Middletown, all of Conn.

[73] Assignee: Olin Corporation, New Haven, Conn.

[21] Appl. No.: 10,181

[22] Filed: Feb. 7, 1979

[51] Int. Cl.³ .................. B29C 19/00; B29C 17/00; B65C 9/25; B29C 1/04
[52] U.S. Cl. .................................... 156/245; 156/285; 156/323; 264/313; 264/316; 264/335; 264/338
[58] Field of Search .............. 264/338, 313, 316, 335; 156/245, 222, 285, 289, 323

[56] References Cited
U.S. PATENT DOCUMENTS

| 2,802,766 | 8/1957 | Leuerenz | 156/289 |
| 3,492,384 | 1/1970 | Matthews | 264/335 |
| 3,542,388 | 11/1970 | Veneko | 156/245 |
| 3,993,527 | 11/1976 | Ohta | 156/323 |

Primary Examiner—Douglas J. Drummond
Attorney, Agent, or Firm—William W. Jones; Paul J. Lerner

[57] ABSTRACT

A method for manufacturing laminated skis wherein the molds in which the skis are built are vacuum wrapped with a plastic film prior to the placement of the ski components in the molds. The adhesive-coated ski components are then placed in the vacuum-wrapped molds in proper fashion. The mold-component assembly is then placed in a press when the ski is formed under pressure and heated so as to set the adhesive. The ski is then stripped off of the mold, the plastic wrap adhering to the ski and leaving behind a clean mold. The plastic wrap is then removed from the ski.

2 Claims, 6 Drawing Figures

SKI MANUFACTURING PROCESS

This invention relates generally to a method for manufacturing skis, and in particular to a method for manufacturing laminated skis, and other laminated products.

Skis of the laminated type, which consist of multiple layers of such materials as fiberglass strips, metal strips, rubber strips, a core, and the like, are presently manufactured by providing the various component layers, precoated with a thermo-setting resin, and building an individual ski in a mold. The mold is a generally flat piece of steel with raised guide portions which engage the components to hold the latter in place. The components are positioned in predetermined fashion on the mold and then after all of the components are in position, the pre-assembly is secured to the mold with strips of tape or the like. The mold is precoated with a mold-release compound so that the thermo-setting adhesive will not stick to the mold after the ski has been formed. The ski-mold assembly is then placed in a press where the ski is properly formed under pressure and heat so as to set the resinous adhesive. During the pressing operation, excess resinous adhesive oozes out of the ski body and is deposited on the mold.

After the forming operations, the ski is stripped out of the mold and undergoes further processing. The mold must then be scraped to remove the adhesive therefrom. Such scraping is necessary even though mold release is applied to the mold before the ski is built therein. The scraping process necessary to clean the mold is undesirable for a number of reasons. First, the use of mold release per se requires special ventilating equipment, as such material may be harmful if inhaled. Secondly, if the scraping is done manually, the likelihood of injury to the wrists of the scrapers has been noted. Thirdly, scraping the molds results in scratching them, so that the effective useful life of a mold is reduced significantly.

This invention relates to a process for manufacturing laminated skis, or other similar products, wherein the necessity of using a mold release compound is avoided. In place of applying a mold release compound to the molds, the molds are covered with a plastic film, preferably an ionomer, such as polypropylene, polyethylene, propionates, and other suitable films, which is vacuum-wrapped onto the molds. The vacuum-wrapped molds are then used in a normal manner to build a laminated ski body, which, when built, is secured to the mold upon which it was built. The mold-ski body assembly is then placed in a ski press which imparts the proper contour to the ski under heat and pressure and, at the same time, cures the thermo-setting resin, so that the formed ski will retain its contour after being removed from the press. After the ski is removed from the press, the plastic film adheres to the bottom of the ski and strips off of the mold, leaving the latter clean and ready for reuse without the necessity of being scraped. The plastic film is removed from the ski during the bottom grinding operation, which is an operation which is performed on the skis even if mold release is used instead of plastic film. Thus, the plastic film serves to protect the mold during the forming operation. The fact that the plastic film is tightly vacuum formed onto the mold permits the mold to perform its alignment function in the same manner as when mold release is used with the improved feature that the plastic film automatically strips off of the mold and sticks to the ski when the latter is removed from the mold after the press-forming operation.

It is, therefore, an object of this invention to provide an improved method for forming skis or other relatively similar products having a laminated construction.

It is a further object of this invention to provide an improved method of the character described wherein a mold is used to align the various layered components of the laminated product, and the layered components are joined together in the final product by means of a resinous adhesive.

It is another object of this invention to provide an improved method of the character described wherein the mold is provided with a plastic film vacuum formed onto the mold to protect the mold from the adhesive.

It is an additional object of this invention to provide an improved method of the character described wherein the plastic film adheres to the laminated product after the latter has been pressure formed and removed from the mold.

These and other objects and advantages of the method of invention will become more readily apparent to those skilled in the art from the following detailed description of a preferred embodiment of the invention, taken in conjunction with the accompanying drawings, in which:

FIG. 4 is a transverse sectional view of the plastic wrapped mold of FIG. 4 showing the various ski component layers applied thereto and secured thereto by tape strips or the like;

Figure 1:
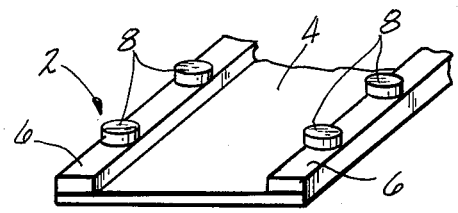
FIG. 1 is a fragmented perspective view of one end of a ski mold with which the improved process of this invention is used.

Referring now to the drawings, FIG. 1 shows one end portion of a typical ski mold with which the improved process of this invention is used. The mold, denoted generally by the numeral 2 is an elongated steel member having an upper surface formed with a central channel 4 and opposed side rails 6. Spaced upwardly protruding bosses 8 are formed on the top surface of the side rails 6. The various layer components of the ski are positioned in the channel 4 and held in place by the bosses 8 in a manner which will be more fully described hereinafter.

Figure 2:
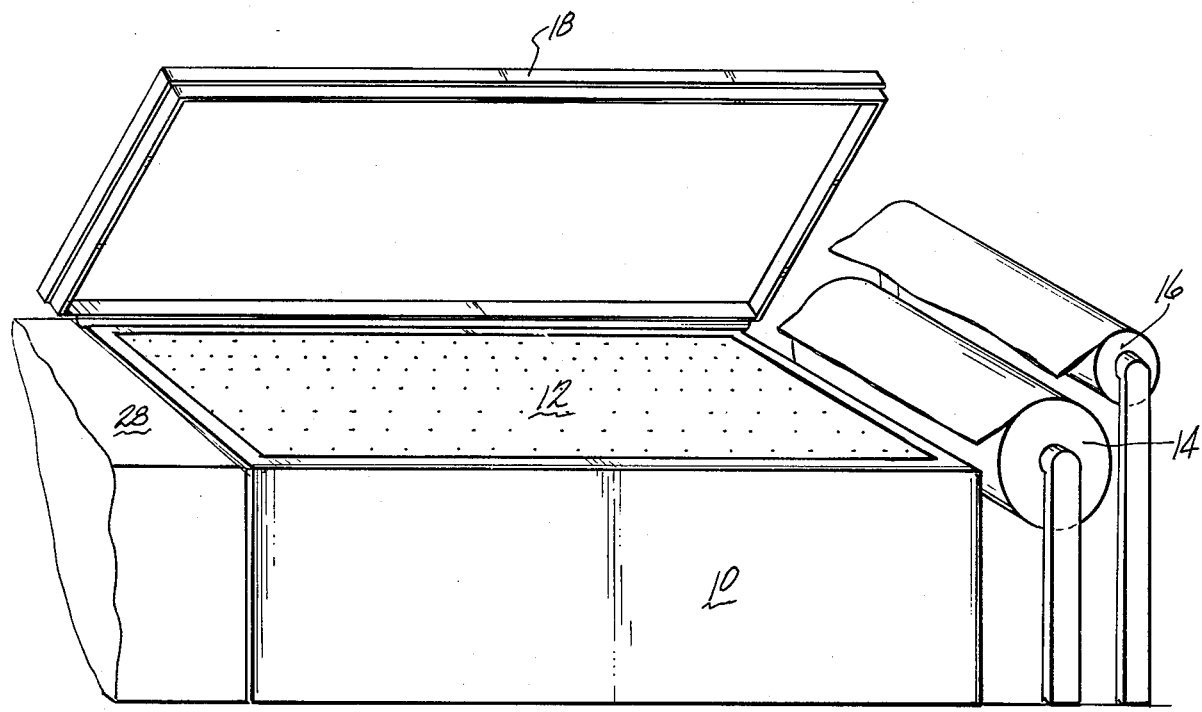
FIG. 2 is a perspective view, somewhat schematicized, of a vacuum forming apparatus used in performing the improved process of this invention.

FIG. 2 shows, somewhat schematically, a vacuum forming machine which is used in conjunction with the improved process of this invention. The machine includes a generally box-shaped housing 10 in which there is provided means (not shown) for drawing a vacuum. Such means are conventional in the art and do not, per se, form a part of this invention. The upper surface of the housing is a perforated plate 12 which forms a bed upon which the molds are vacuum wrapped. A roll 14 of permeable paper, such as Kraft paper, Bogus paper, or corrugated Bogus paper, is provided adjacent of the plate 12, as is a roll 16 of plastic film. The film is preferably an ionomer film, having a thickness in the range of 0.002 in. to 0.005 in. A frame 18 is pivotally mounted adjacent to the plate 12 and serves to hold the edges of the plastic film tightly against the plate 12 when the frame 18 is swung down to a position overlying the plate 12.

The vacuum-wrapped ski molds are produced by first pulling the paper off of the roll 14 so that the paper overlies the plate 12. A number of ski molds 2 are then placed appropriately spaced apart, side-by-side on the paper and the film is then pulled off of the roll 16 to overlie the molds and paper. Heat is applied to heat the film to its melting point. The frame 18 is then swung down on top of the film to press the edges thereof tightly against the paper and plate 12. The vacuum is then applied inside of the housing 10 to draw the plastic film down tightly onto the paper layer and the molds. The vacuum is held for a predetermined time so as to adheres the film to the paper and molds in a known manner. The end of the composite is then cut, the frame 18 is lifted, and the vacuum-wrapped molds are then pulled onto a table 28 (partially shown) an off of the plate 12 thereby freeing the latter for subsequent use. The individual vacuum-wrapped molds are then freed from the composite by cutting the paper-film laminate between adjacent molds, whereby the individual vacuum wrapped molds are ready for further use.

Figure 3:
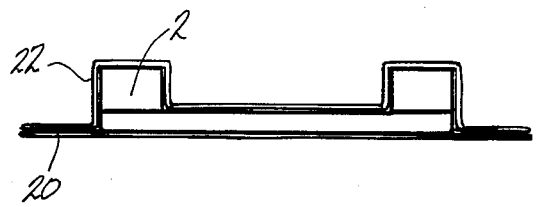
FIG. 3 is an end elevational view of a typical ski mold after the vacuum-formed film has been applied thereto.

A typical vacuum-wrapped mold is shown by way of an end elevational view, in FIG. 3. The mold 2 has on its underside a paper layer 20, and a layer 22 of the plastic film is tightly drawn down onto the upper surface of the mold 2. The film layer 22 is adhered to the paper layer 20 so that the entire "package" may be conveniently handled without special precautions being taken. It will be noted that the film layer 22 very closely overlies every contour of the upper surface of the mold 2. This feature must be obtained so that a ski may be accurately built in the mold-film composite.

Figure 4:
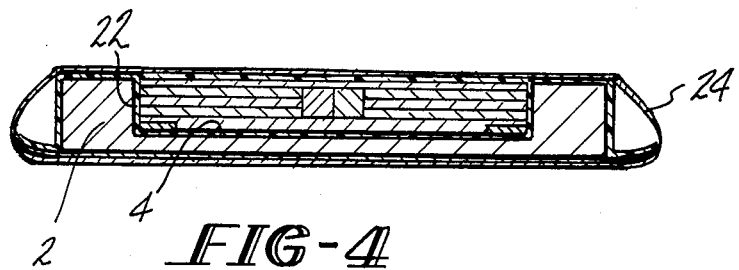

Referring now to FIG. 4, there is illustrated, by means of a transverse sectional view, the appearance of a layered ski prior to the forming and setting operation. It will be noted that the several layers of the ski are assembled in the mold channel 4 in the order in which they make up the finished ski. The individual layers of the ski include metal strips, rubber strips, fiberglass strips, polyethylene strips, a core, and the like in varying numbers. Most of the strips have been pre-dipped or coated with a thermo-setting epoxy resin adhesive. Once the layered body has been built on the mold 2, several strips 24 of tape are wrapped around the ski-mold assembly to secure the layers to place temporarily on the mold. It will be noted from FIG. 4 that the mold 2 is completely protected from contacting the epoxy resin by means of the film layer 22.

Figure 5:
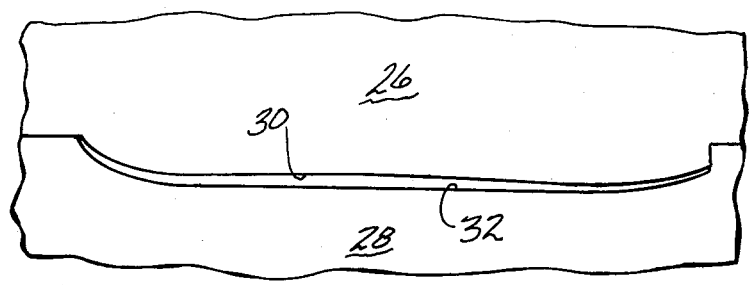
FIG. 5 is a fragmented front elevational view of a ski press showing the ski and mold therein during the forming operation of the ski.

The ski-mold assembly is then placed in a conventional ski press, as shown in FIG. 5, wherein the ski is properly contoured and shaped under pressure and heat to set the resinous adhesive so that the ski will retain its shape after removal from the press. It will be noted that the press has upper and lower platen 26 and 28 respectively between which the ski-mold assembly is positioned. Appropriately contoured surfaces 30 and 32 engage the ski mold and determine the shape of the ski. The ski-mold assembly is retained in the press for approximately twenty minutes at a pressure of approximately eighty psi and a temperature of approximately 100° C. During the pressing operation, the excess epoxy resin is pressed out of the ski and the epoxy remaining in the ski is set so that the ski retains its shape after removal from the press.

Figure 6:
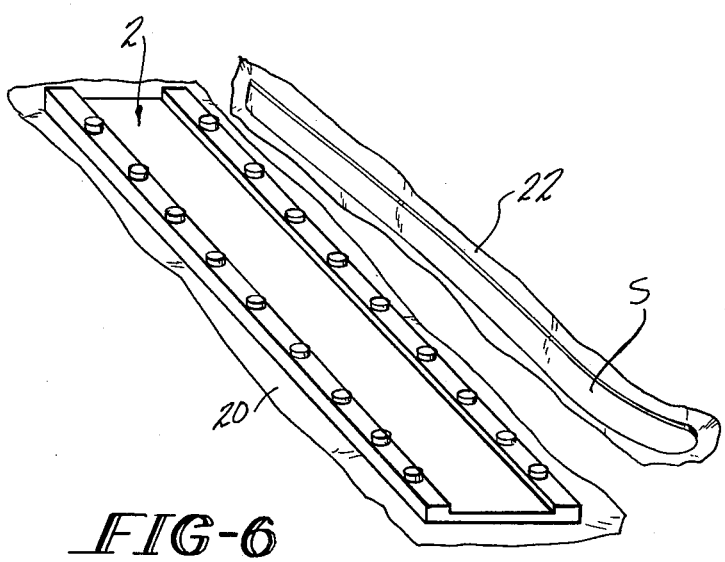
FIG. 6 is a perspective view showing the formed ski stripped away from the mold.

After the ski-mold assembly is removed from the press, the shaped ski S is separated from the mold 2, as shown in FIG. 6. The plastic film 22 adheres to the ski S and the paper 20 remains beneath the mold 2. The mold is then lifted off of the paper 20 in a clean condition ready for reuse. The plastic film 22 adheres to the ski because of the epoxy resin having contacted the film after being expressed from the ski during the molding operation. The film 22 is removed from the ski during the rough grinding operations on the bottom and sides of the ski. Thus, the film 22 is removed without the need of any additional steps being performed in the whole ski-making process.

It will be readily appreciated that the process of this invention eliminates the tedious and difficult step of scraping molds after the ski has been formed as well as eliminating the need to apply a potentially hazardous coating of mold release to the mold. The process protects the molds from the epoxy resin, with the protecting film layer being automatically stripped off of the mold along with the ski by reason of the film adhering to the ski. The film is removed from the ski during subsequent rough grinding operations.

Since many changes and variations of the disclosed embodiment of the invention may be made without departing from the inventive concept, it is not intended to limit the invention otherwise than as required by the appended claims.

What is claimed is:
1. A method of forming a laminated ski comprising the steps of:
   (a) providing a ski mold having a portion thereof which supports individual layers of the ski during the forming operation;
   (b) vacuum forming a layer of plastic film onto said portion of said ski mold;
   (c) positioning various components of the ski on said vacuum-wrapped portion of said ski mold, at least some of said components being pre-coated with thermo-setting adhesive, until a ski pre-assembly has been formed on the mold;
   (d) subjecting said mold and ski pre-assembly to heat and pressure to form a contoured ski pre-assembly and set the adhesive under conditions wherein an excess of the adhesive is expressed from the ski pre-assembly into contact with said plastic film layer;
   (e) separating said mold from the contoured ski pre-assembly whereby said plastic film layer adheres to said contoured ski pre-assembly; and
   (f) removing said plastic film layer from said contoured ski pre-assembly.

2. A method of forming a laminated ski comprising the steps of:
   (a) providing a ski mold having a portion thereof which supports layers of components which make up the ski, said portion being covered by a plastic film layer vacuum formed onto said ski mold;
   (b) building a laminated ski pre-assembly on said portion of said mold by properly positioning all of the components of the ski in layered fashion on said mold, at least some of said components being pre-coated with a settable adhesive material;
   (c) imparting to the laminated ski pre-assembly the proper shape and contour of a ski while concurrently causing said plastic film layer to adhere to the laminated ski pre-assembly;
   (d) stripping the shaped and contoured ski pre-assembly and the plastic film layer adhering thereto away from said mold; and
   (e) removing the adhering plastic film layer from the ski pre-assembly.

* * * * *